UNITED STATES PATENT OFFICE.

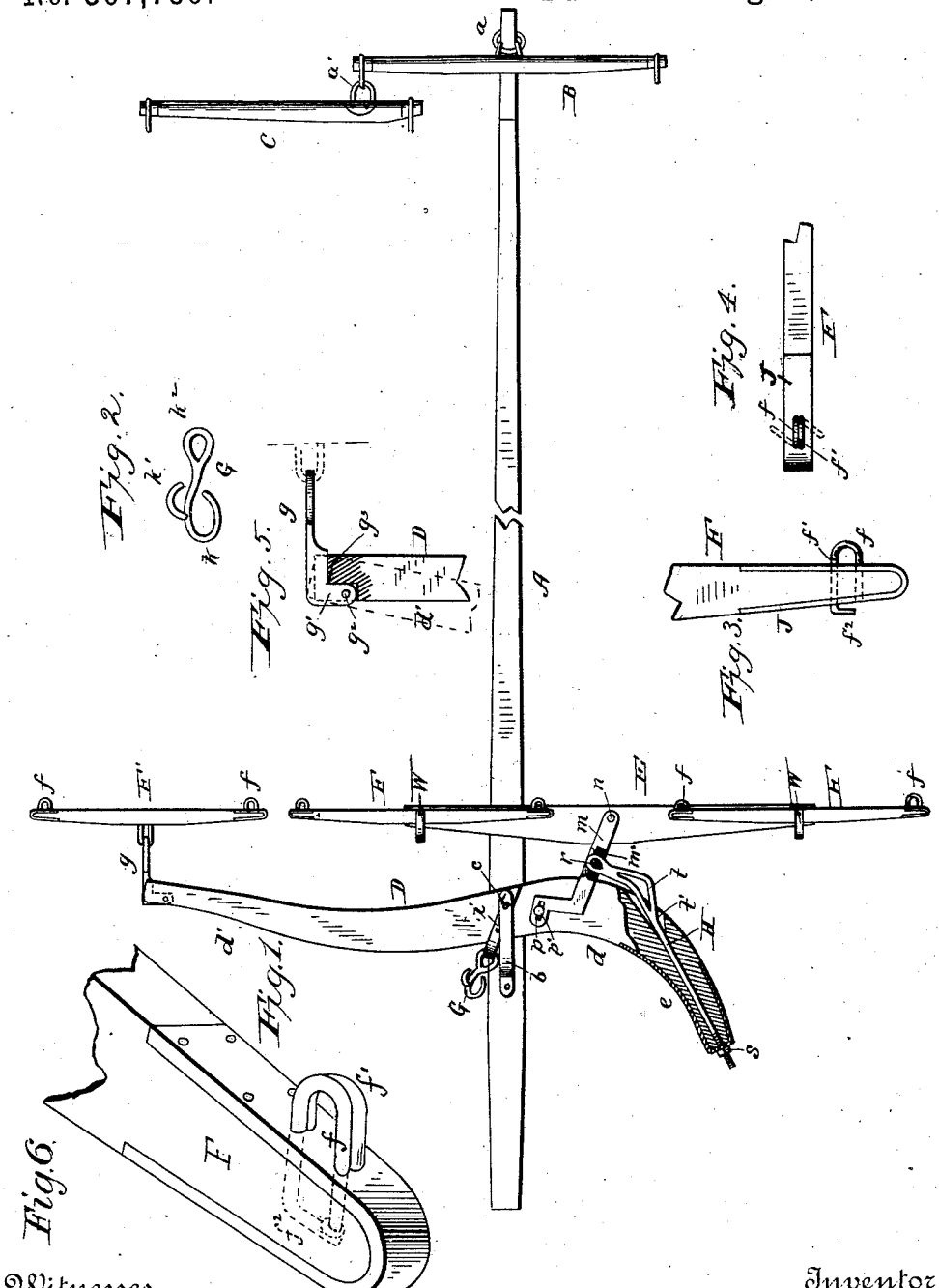

WILLIAM H. BAKER, OF OXFORD, ASSIGNOR OF ONE-HALF TO SAMUEL W. SMITH, OF PONTIAC, MICHIGAN.

DRAFT-EQUALIZER.

SPECIFICATION forming part of Letters Patent No. 367,739, dated August 2, 1887.

Application filed March 7, 1887. Serial No. 230,020. (No model.)

*To all whom it may concern:*

Be it known that I, WILLIAM H. BAKER, a citizen of the United States, residing at Oxford, in the county of Oakland and State of Michigan, have invented certain new and useful Improvements in Draft-Equalizers, of which the following is a specification, reference being had therein to the accompanying drawings.

This invention relates to certain novel improvements in draft-equalizers designed for three horses abreast and adapted to be readily attached to the draft-tongue of a wagon, to a plow, or to a drag or harrow, which improvements will be fully understood from the following description, taken in connection with the annexed drawings, in which—

Figure 1 is a plan view of my improved three-horse draft-equalizer partly in section and attached to the draft-tongue of a wagon. Fig. 2 is a view of the grab-hook used for attaching the equalizer either to a plow or to a drag or harrow. Figs. 3 and 4 are views of one end of a singletree, showing the improved safety-hooks for the tugs; and Fig. 5 is a view, partly in section, of one end of the curved evener, showing the singletree-hook for the third horse and its pivoted angular draft-arm and the abutment therefor. Fig. 6 is a perspective view of one end of one of the singletrees, showing somewhat enlarged the two hooks $ff'$ for connecting a tug.

Referring to the annexed drawings by letter, A designates a draft-tongue for a wagon, which is provided with the usual hammer-strap, $b$, and a vertical removable draw-bolt, $c$, to which a curved evener, D, is pivoted. At the front end of said tongue A is linked at $a$ the neck-yoke bar B, to one end of which is linked at $a'$ the neck-yoke C for the third horse.

E designates a doubletree, to the ends of which are secured clips W W, to which are pivoted singletrees F F.

The doubletree E is connected by angular clip-straps $m\ m'$ to the curved evener D. The front ends of said straps $m\ m'$, which receive between them the doubletree E, are connected to this tree by a vertical pivot-bolt, $n$, and the rear angular ends of said straps are provided with oblong slots $p$, which receive a bolt, $p'$, that passes vertically through the evener D on one side of the draft-tongue A, very near to this tongue, as clearly shown in Fig. 1 of the annexed drawings. The said draft-evener D is a rigid bar having a short curve, $d$, and a long curve, $d'$. The long curved arm $d'$ is intended to prevent contact of the evener with the left-hand front wheel of a wagon if the equalizer is applied to the draft tongue of a wagon, and the short curved portion has a tapered hole, $t'$, horizontally and obliquely through it, through which passes a rigid bracing-bar, H, provided with an angular bracing-knee, $t$, and a nut, $s$, which latter is designed for adjusting said bar H endwise and changing the fulcrum-point $r$ with respect to the points $n$ and $p$. The fulcrum-point $r$ is a bolt passed freely through an eye in the inner end or knee, $t$, of the bar H. It will thus be seen that while the straps $m\ m'$ are free to articulate about their pivot-bolts the draft falls directly on the adjustable bar H. It will also be seen that fulcrum $r$ can be changed to balance or equalize the draft on the evener D, as circumstances may require.

When the equalizer is applied to a wagon-tongue, A, as shown, the evener D is pivoted to this tongue by a vertical fulcrum-bolt, $c$, which passes through a clip-strap, $i$, to the rear looped end of which a compound hook, G, is attached, which hook and its purpose will be hereinafter described.

The extremity of the longest arm, $d$, of the evener-lever D is horizontally and angularly grooved, forming shoulders or abutments $g^3$ at right angles to each other, and in the rear part of said groove is pivoted at $g^2$ the right-angular shank $g'$ of a draft-hook, $g$, to which latter the singletree F' for the third horse is linked. When the horses are all abreast and in line, the shank $g'$ of hook $g$ bears against the shoulders $g^3$, as shown in Fig. 5; but when the third horse is in advance of the other two horses the shank $g'$ of hook $g$ leaves its shoulders, and the leverage of the equalizer is lengthened.

For the purpose of attaching the equalizer to a plow-clevis or to a drag, instead of to a wagon-tongue, A, I remove the draw-bolt $c$ and detach the equalizer from said pole and employ the compound hook G, above referred to. This hook (shown clearly in Fig. 2) consists of a horizontal hooking portion, K, adapted for a vertical plow-clevis, and a vertical hooking branch, K', adapted for a horizontal loop or link attachment of a harrow or drag. The eye K², which is on the shank of the hook G, receives the loop of the clip i, which is secured to the curved evener D, as shown in Fig. 1.

For the purpose of safely attaching the tugs or traces of the harness to their respective singletrees, I employ the following device on each end of each tree, reference being had to Figs. 3 and 4 of the annexed drawings.

J designates a strengthening shoe or strap, which is rigidly secured to the end of the singletree F, through which and this tree holes are made horizontally and transversely in different horizontal planes. Through one of these holes is passed the shank of a hook, f, so that this shank will swivel and allow its hook to be adjusted in the position indicated in dotted lines, Fig. 4. Through the other hole is passed the shank of a swivel-hook, f', the rear end of its shank being bent, as indicated at f². When these hook are adjusted, as indicated in dotted lines, Fig. 4, a chain-link on a tug can be readily engaged with them, after which the hooks are closed, as indicated in full lines in said figure, thereby effectually preventing a casual detachment of the tug from them.

By reference to Fig. 6 it will be observed that the two swivel-hooks f f', when brought together, are in a horizontal plane, and that their open ends are respectively closed by the opposed shanks, thus effectually preventing a casual detachment of a tug.

Having described my invention, what I claim as new, and desire to secure by Letters Patent, is—

1. The combination, in a draft equalizer for three horses, of the evener-lever curved, as described, and provided with a singletree attached to its longest arm, a clip adapted to receive a fulcrum-bolt, c, a doubletree connected to the shorter arm of said evener by slotted angular clip-straps and pivots, and an endwise adjustable bar pivoted to said clip-straps, all substantially as described.

2. The combination of the doubletree provided with singletrees, the slotted angular clip-straps m m', pivotally connecting said doubletree to the curved evener, and the endwise adjustable bar H, having a knee, t, pivoted to the said straps and passed obliquely through a tapered hole through the curved short arm of said evener, and a singletree having an angular-shanked hook pivoted in a shouldered groove in the extremity of the long arm of said evener, substantially as described.

3. The combination of the doubletree and the singletree with the evener D, curved as described, the connecting clip-straps m m', and the adjustable bar H, substantially as described.

4. The combination, with the curved evener, of the hook G, as described, the double and single trees, the angular clip-straps, and the adjustable bar H, pivoted to these straps, substantially as described.

5. The combination, with the singletree having horizontal holes in its ends, of the swiveled hooks f f', the shanks of which are inserted in the horizontal holes in the singletree, one of the said hooks being provided with a bent arm for operating it, substantially as described.

In testimony whereof I affix my signature in presence of two witnesses.

WILLIAM H. BAKER.

Witnesses:
A. S. WARNER,
T. H. RICE.